United States Patent
Jacobson et al.

(10) Patent No.: US 7,197,573 B1
(45) Date of Patent: Mar. 27, 2007

(54) SYSTEM AND METHOD FOR IDENTIFYING ADDRESSES TO MODIFY AND THE EFFECTS THEREOF

(75) Inventors: Van Jacobson, Woodside, CA (US); Haobo Yu, Sunnyvale, CA (US); Cengiz Alaettinoglu, Sherman Oaks, CA (US)

(73) Assignee: Packet Design, Inc., Palo Alto, CA (US)

( * ) Notice: Subject to any disclaimer, the term of this patent is extended or adjusted under 35 U.S.C. 154(b) by 700 days.

(21) Appl. No.: 10/298,918

(22) Filed: Nov. 18, 2002

(51) Int. Cl.
*G06F 13/00* (2006.01)

(52) U.S. Cl. .................... 709/239; 709/242; 718/105; 370/237

(58) Field of Classification Search .............. 709/238, 709/245, 235, 239, 242; 718/105; 370/237
See application file for complete search history.

(56) References Cited

U.S. PATENT DOCUMENTS

| | | | |
|---|---|---|---|
| 2003/0142682 A1* | 7/2003 | Bressoud et al. | 370/401 |
| 2004/0085911 A1* | 5/2004 | Castelino | 370/252 |
| 2004/0095893 A1* | 5/2004 | Goringe et al. | 370/252 |

OTHER PUBLICATIONS

Tamas Mahr et al.; Time Series Based Simulation Architecture; Feb. 2003.*

* cited by examiner

*Primary Examiner*—Kenneth R. Coulter
(74) *Attorney, Agent, or Firm*—Innovation Partners; Charles E. Gotlieb

(57) ABSTRACT

A system and method identifies ranges of addresses that can be reallocated and/or split to cause traffic to be redirected in a network to reduce the utilization of the most utilized links in an autonomous system. The system and method then identifies the utilization of the autonomous system after the reallocation and/or split and reports on the differences of utilization pre- and post-split.

21 Claims, 4 Drawing Sheets

SYSTEM AND METHOD FOR IDENTIFYING ADDRESSES TO MODIFY AND THE EFFECTS THEREOF

RELATED APPLICATIONS

The subject matter of this application is related to the subject matter of application Ser. No. 09/973,234 entitled, "SYSTEM AND METHOD FOR DEFENDING AGAINST ATTACKS ON COMPUTER SYSTEMS" filed on Oct. 9, 2001 by Van Jacobson and Kevin B. Martin, and application Ser. No. 60/299,382 entitled, "METHOD AND APPARATUS FOR BALANCING INTRA-AS NETWORK TRAFFIC WITHIN AN AS" filed on Jun. 18, 2001 by Van Jacobson, Haobo Yu, and Cengiz Alaettinoglu, application Ser. No. 10/298,938 entitled, "METHOD AND APPARATUS FOR ALLOCATING TRAFFIC AMONG ROUTERS ON A COMPUTER NETWORK" by Haobo Yu, Van Jacobson and Cengiz Alaettinoglu, filed concurrently herewith, each having the same assignee as this application and each is incorporated herein by reference in its entirety.

FIELD OF THE INVENTION

The present invention is related to computer software and more specifically to computer networking software.

BACKGROUND OF THE INVENTION

The related application Ser. No. 10/298,938 describes a method and apparatus for spreading traffic among routers in a packet network by causing routers in an autonomous system to send traffic over a border router capable of forwarding traffic to its intended destination that is different from the border router having the least cost path that is capable of forwarding traffic to its intended destination.

To cause the routers in an autonomous system (AS), which is a portion of a network under administrative control of a single entity, to send traffic over a border router capable of forwarding traffic to its intended destination that is different from the border router having the least cost path that is capable of forwarding traffic to its intended destination, ranges of addresses advertised by at least two border routers as the ranges of addresses to which they are able to forward communications are reallocated among the routers and optionally, split, causing traffic for that range of addresses to be carried by more than one border router.

This technique can help alleviate the overloading of links caused by a relatively large volume of traffic received by one router that is sent outside the AS, such as when circuit traffic is carried over a packet network such as the Internet. Instead of the normal case in which a router receives a small (relative to the total it receives) amount of traffic for each of many destinations which end up being served by routers dispersed throughout the AS, when a large amount of traffic is received for a small number of one or more destinations, it can cause one or more links to those one or more destinations to become over-utilized, which can increase delays through the network.

However, there is another use for this technique. If it is possible to identify links that have a high utilization and identify the source of the traffic causing such high utilization, the technique described in the related application Ser. No. 10/298,938 could be applied to that source and the address ranges corresponding to destination addresses causing the high utilization of links, which could serve to more evenly spread the utilization of links in the AS. However, it could also shift traffic to links that, although not over-utilized before, become over-utilized as a result of the application of the technique.

What is needed is a system and method for identifying ranges of addresses on which the technique described in the related application Ser. No. 10/298,938 could be used to reduce utilization of the highest-utilized links, and for analyzing the effect of causing traffic to use a path other than the least cost path in an autonomous system.

SUMMARY OF INVENTION

A system and method records packets received by various ingress routers in an AS, and then using the destination addresses in the packets recorded, simulates traffic in the AS. The system and method identifies links that have the highest utilization and the paths through the AS that utilize those links. An ingress router and the ranges of addresses advertised by routers at the end of such paths as IP addresses reachable by those routers are selected based on the amount of the recorded packet traffic to those ranges of addresses. The selected ranges of addresses are then reallocated among the border routers, and optionally split using the selected ingress router as described in the related application Ser. No. 10/298,938. However, instead of advertising the reallocated and/or split ranges to other routers in the AS, the reallocated and/or split address ranges may be used to resimulate the recorded packet traffic and compare the utilization without such reallocation and/or splitting to the utilization that would occur if such address reallocation and/or splitting had been implemented.

DETAILED DESCRIPTION OF A PREFERRED EMBODIMENT

Figure 1:
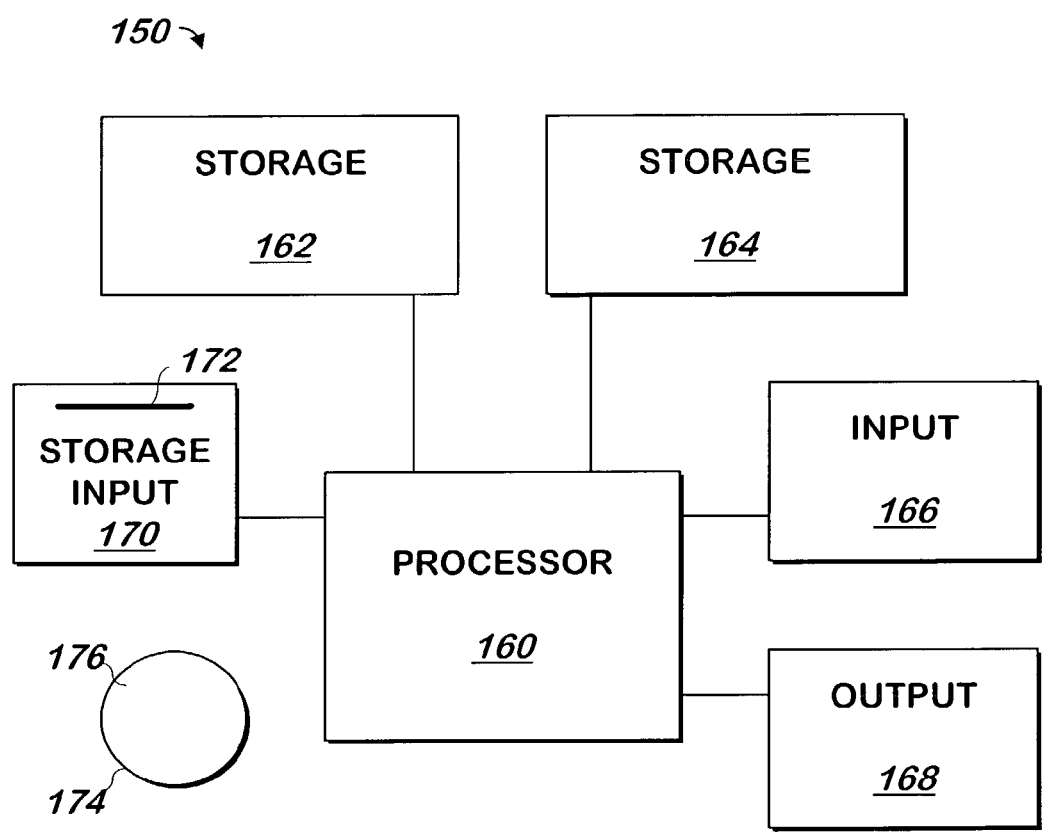
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, INC., of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from Microsoft Corporation of Redmond Wash. or running the FREEBSD operating system commercially available from the website FREEBSD.ORG, or a MACINTOSH computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or the conventional INTERNET EXPLORER browser commercially available from Microsoft, although other systems may be used.

Figure 2:
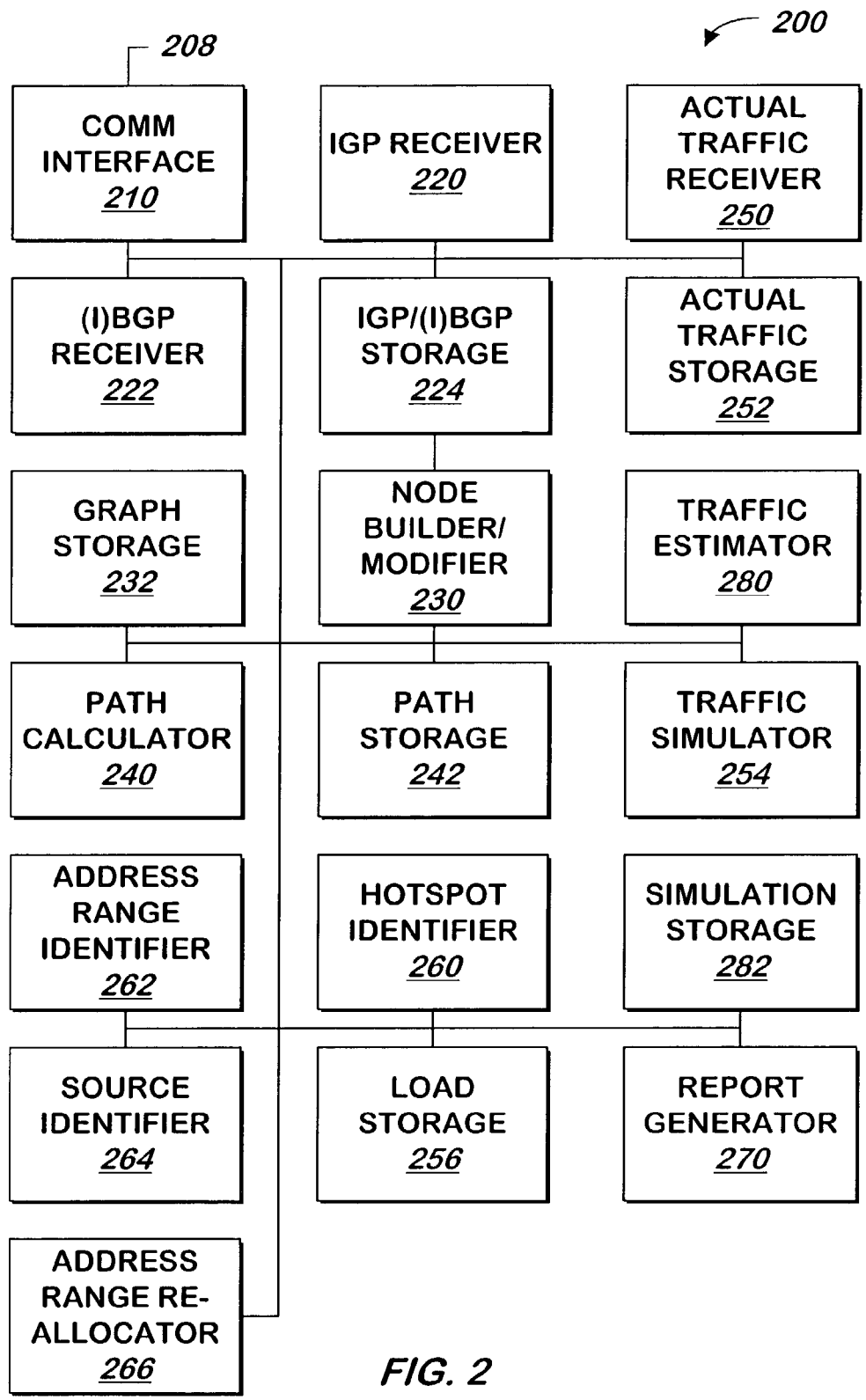
FIG. 2 is a block schematic diagram of a system for identifying ranges of addresses to reallocate and/or split according to one embodiment of the present invention.

Referring now to FIG. 2, a system 200 for identifying ranges of addresses to reallocate and/or split is shown according to one embodiment of the present invention. In one embodiment, all communication into or out of system 200 is made via input/output 208 of communication interface 210 which is coupled to a network such as the Internet or a local area network or both. Communication interface 210 is a conventional communication interface that supports TCP/IP or other conventional communication protocols.

Gather Topology

IGP receiver 220 and (I)BGP receiver 222 gather information about the topology and bandwidth of the AS from internal routers and border routers, respectively. This information is stored in IGP/(I)BGP storage 224, as will now be described.

IGP receiver 220 participates in a series of communications with internal routers of the AS using a conventional IGP protocol such as RIP-2, OSPF, or IS-IS. RIP-2 is described in RFC 1723, OSPF is described in RFC 1583, and IS-IS is described in RFC 1195; all RFCs can be found on the website of the Internet Engineering Task Force, ietf.org which is hereby incorporated by reference herein in its entirety. As part of these communications, IGP receiver 220 receives information about each of the nodes in the AS and the links between them. This information may include the IP addresses assigned to each node and the cost metrics assigned to the links between each such node.

In one embodiment, bandwidths for each link are also obtained, via TE extensions to the protocol used. In another embodiment, IGP receiver 220 obtains the bandwidths by logging into each router in the AS and using the SNMP protocol to request the bandwidths of each such connection. In another embodiment, IGP receiver 220 requests and receives path and bandwidth information from a database (not shown); in still another embodiment, IGP receiver 220 receives the path and bandwidth information from the system operator via a conventional keyboard/monitor (not shown) and communications interface 210. In still another embodiment, bandwidths of each link are approximated using a formula that assigns bandwidths to each link inversely proportional to the cost metric assigned to that link. IGP receiver 220 stores all such received and/or approximated information in IGP/(I)BGP storage 224.

(I)BGP receiver 222 participates in a series of communications with border routers of the AS which system 200 is simulating using the conventional BGP protocol, which protocol is described in RFCs 1267 and 1268, although other versions of the protocol and other similar protocols may be used. As part of these communications, (I)BGP receiver 222 receives lists of ranges of addresses (expressed as a prefix and mask pair) reachable by the border routers, and the costs, in number of AS hops, of reaching those addresses. In one embodiment, bandwidths of each link from each border router in the AS to each border router in another AS to which the border router is directly connected are obtained by (I)BGP receiver via TE extensions to the protocol used. In another embodiment, (I)BGP receiver 222 obtains the bandwidths by logging into each border router in the AS and using the SNMP protocol to request and receive such bandwidths.

In another embodiment, (I)BGP receiver 222 requests and receives address and bandwidth information from a database (not shown); in another embodiment, (I)BGP receiver 222 logs into each border router and runs, via TELNET, a command line interface script or "expect" script installed on each border router that provides such bandwidth and uses conventional screen scraping techniques (e.g. locating the bandwidth by character position, or character position relative to known text) to obtain the bandwidths of each link between that border router and one or more border routers in another AS from the results; in still another embodiment, (I)BGP receiver 222 receives the path and bandwidth information from the system operator via a conventional keyboard/monitor (not shown) and communications interface 210. (I)BGP receiver 222 stores all such received information in IGP/(I)BGP storage 224.

Build Nodes, Add Virtual Nodes

Once IGP/(I)BGP storage 224 has been filled with information as described above, IGP receiver 220 and (I)BGP receiver 222 signal node builder/modifier 230 (which they may do after they have received all of the available information, described above, from the network). Node builder/modifier 230 reads IGP/(I)BGP storage 224 and builds a model of the AS in graph storage 232.

Node builder/modifier 230 reads path and bandwidth information in IGP/(I)BGP storage 224 and constructs a model of the AS in the following manner: each router, logical router, and internal network of the AS is considered to be a node of the AS, and for each node of the AS node builder/modifier 230 creates an entry in graph storage 232, for example, by using the techniques described in the related application Ser. No. 09/973,234. Within each entry, node builder/modifier 230 places an identifier such as the IP address of the node being modeled, and a list of items. Node builder/modifier 230 places, in each item, an identifier such as IP address of a node within the AS that can be reached directly (that is, without passing through any other node, i.e. in one "hop") by the modeled node. If the node being modeled is a border router, node builder/modifier 230 also places a set of prefixes and masks indicating a range of addresses external to the AS reachable from this node. In addition, node builder/modifier 230 places the bandwidth of the link from the modeled mode to each neighbor node and the cost of the link to that node in each item in the list.

In one embodiment, node builder/modifier 230 also adds virtual nodes to the model in graph storage 232, in a manner that is described in the related application 60/299,382 identified above.

Calculate and Store Least Cost Paths

Path calculator 240 uses the model of the AS in graph storage 232 and a conventional path calculation algorithm such as the Shortest Path First (SPF) algorithm (also known as the Dijkstra algorithm) to identify the least cost path between every pair of border routers in the AS. A description of how Dijkstra's algorithm is used to compute routes can be found in "OSPF: Anatomy of an Internet Routing Protocol", by J. Moy, Addison-Wesley, 1998, which is hereby incorporated by reference herein in its entirety. Path calculator 240 then identifies the routers in the least cost path between each pair of border routers.

In another embodiment, path calculator 240 selects one of the border routers in the AS as a source border routers, builds a routing table at a selected source border router, identifies the link to the next router on the least cost path to a destination border router selected from among the remaining border routers of the AS, builds the routing tables at the node at the end of that link, and repeats the process until the destination border router has been reached. Path calculator 240 selects another destination border router, and repeats the process until all border routers other than the selected source border router have been used as destination border routers. Path calculator 240 then selects another source border router and repeats the process until all such least cost paths between pairs of border routers have been identified using routing tables in this manner.

For each path between a source and destination border routers, path calculator 240 creates an entry containing an ordered list of the IP addresses of each node in the computed path, and stores the entry in path storage 242. Path calculator 240 also stores one or more prefix/mask sets advertised as reachable by the destination border router in the entry in path storage 242, representing the external IP addresses reachable by the last node in the path.

Gather Actual Traffic Data

Actual traffic receiver 250 receives traffic flowing through various routers such as all ingress routers in the AS to sample the traffic received by each such router. The receipt may occur via data collection ports of the router, such as Cisco SPAN ports (e.g. using tcpdump-style collection), or via products such as the conventional Netflow product commercially available from Cisco Systems, Inc of San Jose Calif. that provide it as it is received or store it into a database, which actual traffic receiver 250 may access. For each packet sampled, actual traffic receiver 250 stores the packet header, the number of data bytes, the IP address of the ingress router, and a time offset, into the entry in actual traffic storage 252. Although packet traffic (such as TCP/IP traffic) in a packet network is described herein, the present invention applies to all types of network traffic and need not be limited packet traffic or TCP/IP packets.

Actual traffic receiver 250 computes the time offset in the following manner: every time actual traffic receiver 250 receives a sampled packet, actual traffic receiver 250 requests and receives a timestamp consisting of the current date and time from operating system (not shown). Actual traffic receiver 250 computes the time offset by subtracting from this timestamp another timestamp that it requested and received from operating system when the first such sampled packet was received from that router. Thus the first packet sampled from a particular router will have a time offset of zero, and each subsequent sampled packet from that same router will have a time offset greater than the one before. In another embodiment, the time offset is computed as the difference from the current time and a reference time, such as midnight.

In one embodiment, actual traffic receiver 250 stores the information described above for every packet received from any data collection port. In another embodiment, actual traffic receiver 250 stores a fraction of the packets received from any data collection port, such as one fifth, although other embodiments store other fractions of packets received from the data collection port or ports used to supply traffic to actual traffic receiver 250.

Actual traffic receiver 250 may be made of more than one device so that actual traffic may be simultaneously collected from more than one router at a time. In such embodiment, the various devices synchronize their clocks to ensure that the timestamps are consistent from one device to the next.

In one embodiment, actual traffic receiver 250 discards any received packets that contain either a source IP address or a destination IP address that is within the AS, thus preserving only those packets that travel between pairs of border routers and through the AS on their way to another AS.

In one embodiment, actual traffic receiver 250 receives packets from each border router in the AS during a sampling period having the same duration such as twenty-four hours, but occurring during different times, with actual traffic receiver 250 receiving traffic from a different router during any different time. When traffic from all designated border routers (which may be all the border routers in the AS) has been received as described above, actual traffic receiver 250 stops receiving packets and signals traffic estimator 280. In one embodiment the system operator can control how long, and from which border routers, actual traffic receiver 250 receives packets, although actual traffic receiver 250 may use a default time period if no such time period is specified. In one embodiment, a single border router or any fraction or all of the border routers in an AS are used to receive traffic as described above.

Identify Path of Each Packet

Traffic estimator 280 estimates the traffic on each link across the AS by selecting certain data stored in actual traffic storage 252. To estimate traffic, traffic estimator 280 first identifies the path that will be traveled by each packet according to the paths stored in path storage 242. Traffic estimator 280 identifies paths by examining each entry in actual traffic storage 252, and using the IP address of the ingress router stored in the entry and the destination IP address from the packet header stored in the entry, looks up the path through the AS in path storage 242 that starts at the ingress router and has the least cost path to a border router that advertised a range of addresses corresponding to the destination IP address from the packet header. There may be multiple border routers capable of reaching that destination IP address, and traffic estimator 280 will select the one that has the least cost path from the ingress router from which the packet was received (and that is stored in the entry in actual traffic storage 252). For each entry in actual traffic storage 252, traffic estimator 280 places an identifier of the looked-up path, such as an identifier of the entry in path storage 242 corresponding to the looked-up path, in the entry in actual traffic storage 252.

There may be more than one least cost path from the ingress router stored in the entry to a border router that advertised it can forward traffic to a range of addresses that includes the destination IP address of the packet. In one embodiment, traffic-estimator 280 stores the identifier of each such path in the entry in actual traffic storage 252. In another embodiment, one such identifier is randomly assigned by traffic estimator 280.

Group Packets by Receipt Interval

Traffic estimator 280 assigns the entries in actual traffic storage 252 to a group by time in the following manner: traffic estimator 280 assigns all entries with a time offset during a first time interval such as between zero and six seconds to a first group, between a second time interval such as between six seconds and twelve seconds to a second group, and so on in this manner until traffic estimator 280 has assigned all entries to a group such that the traffic assigned to the same group will correspond to the same interval, where all intervals have the same duration, all are consecutive in time, and no interval overlaps another interval in time.

In another embodiment, traffic estimator 280 uses other values for the duration of each interval, such as six minutes or 30 minutes or 60 minutes, although any interval may be used.

Sum Packets Using the Same Path During the Same Interval

Traffic estimator 280 sorts the entries within each group by path and builds one measure of traffic entry for each group and path. The measure of traffic entry contains the identifier of the group and path and the number of packets and number of bytes sent over that path by all the members of the group. In one embodiment, traffic estimator 280 also adds the identifier of the group and path to each measure of traffic entry it builds. Traffic estimator 280 stores these measure of traffic entries, one per group per path, internally within traffic estimator 280.

As described above, entries may be assigned to more than one path, if more than one path had the least cost. In such embodiment, when traffic estimator 280 uses such an entry to cumulate the number of packets and number of bytes in the measure of traffic entry, it will divide the number of packets and number of bytes in the packet corresponding to the entry, equally among the measure of traffic entry for all of the paths in the entry. For example, assume in one group, there are two packets with 500 bytes that would use path A, two packets with 400 bytes that would use path B and one packet with 200 bytes that would use path C or path D, the measure of traffic entries for that group are, for path A: 1000 bytes, two packets; for path B: 800 bytes and two packets; for path C: 100 bytes and 0.5 packets; for path D, 100 bytes and 0.5 packets.

Traffic estimator 280 sorts all of the measure of traffic entries together by path, and sorts measure of traffic entries with common paths by the total number of bytes of data that traversed that path during the group time interval.

For each path in the sorted measure of traffic entries in storage internal to traffic estimator 280, traffic estimator 280 marks the measure of traffic entry and selects the data byte count for the measure of traffic entry that matches a selection criteria, such as the measure of traffic entry having a data byte count in the ninety-fifth percentile of all data byte counts for that particular path. To identify the ninety-fifth percentile path, for each path, traffic estimator 280 multiplies 0.05 times the number of measure of traffic entries corresponding to the path, rounds this number to the nearest integer (referred to as N), and selects the Nth measure of traffic entry of the sorted measure of traffic entries corresponding to that path in storage internal to traffic estimator 280, counting from the measure of traffic entry with the highest data byte count. Once traffic estimator 280 has selected such a measure of traffic entry, traffic estimator 280 stores the data byte count from the selected measure of traffic entry into the corresponding measure of traffic entry in path storage 242, and signals traffic simulator 254.

Thus, the 95th percentile entry for each path is selected as the representative traffic for the path. Although a 95th percentile selection criteria is used in the embodiment described above, other embodiments use other selection criteria, such as the 90th percentile or traffic received during a certain time or day, or the 90th percentile traffic received during a specific one hour period.

In one embodiment, before storing the representative data byte count in each entry in path storage 242, traffic estimator 280 adjusts the data byte count. For example, adjustment upwards may be made to account for the fact that traffic is only sampled every nth packet or otherwise.

Simulate

Figure 4:
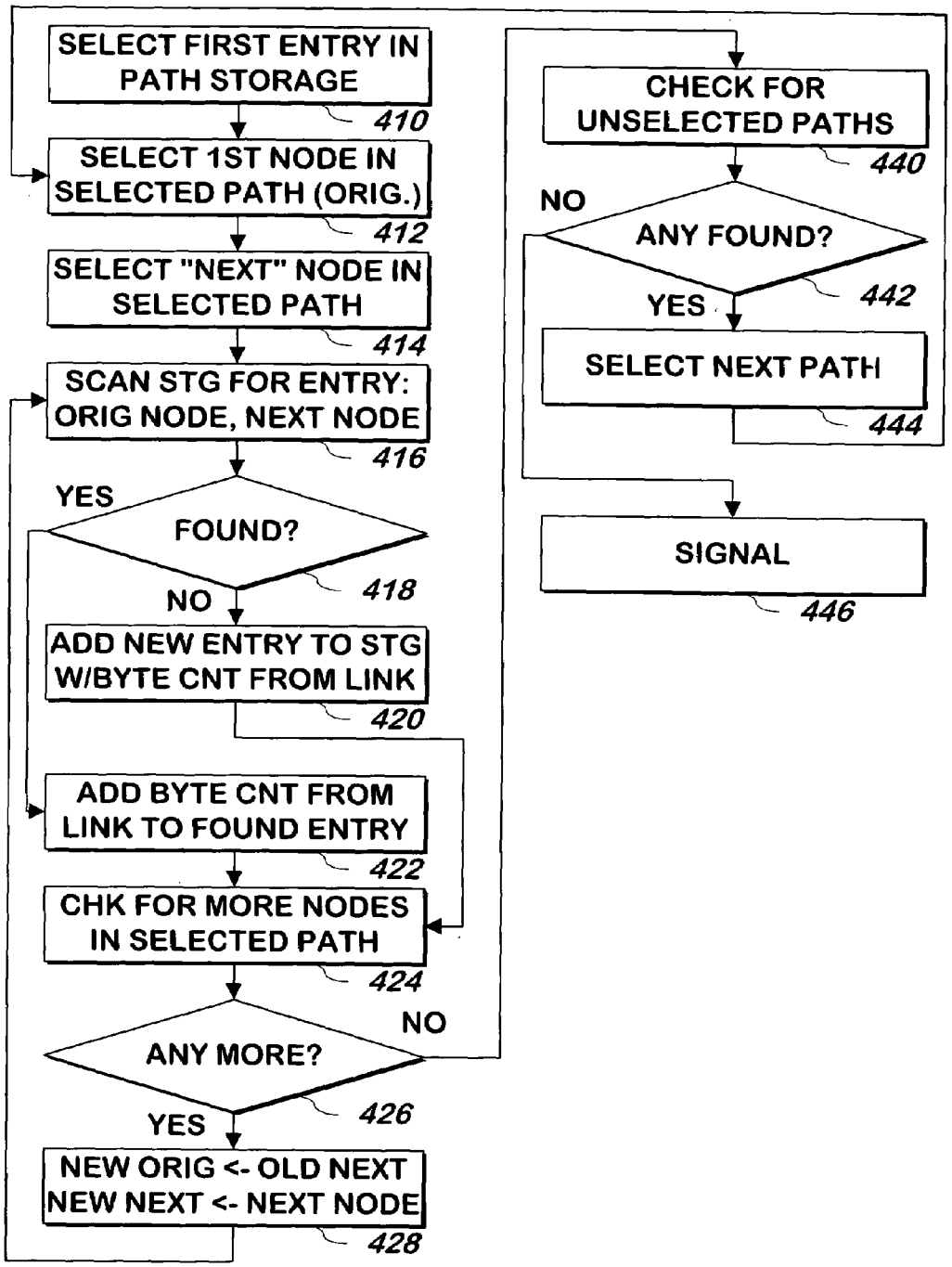
FIG. 4 is a flowchart illustrating the simulate function performed by the traffic simulator of FIG. 3.

Referring now to FIGS. 2 and 4, traffic simulator 254 builds in simulation storage 282 a list of all the links in every path in path storage 242 and cumulates the bandwidth used on each link in the path by the traffic assigned to each path in path storage 242 as described above. To accomplish this cumulation, traffic simulator 254 selects 410 the first entry in path storage 242, and selects 412 the first node in the path, herein referred to as the origination node. Traffic simulator 254 selects 414 the "next" node in the path, and scans 416 simulation storage 282 looking for a link entry between the origination node and the next node, which will exist in simulation storage 282 if such link entry was already entered in simulation storage 282 due to another path. If traffic simulator 254 does not find such a link entry 418, traffic simulator 254 adds 420 a link entry to simulation storage 282 for the link. Each link contains a pair of identifiers, such as IP addresses, consisting of the identifiers of the nodes at the end of each link and a byte count, initialized to zero, which is the data byte count from the selected path storage 242 entry. If traffic simulator 254 finds such a link entry 418, traffic simulator 254 adds 420 the data byte count of the selected path storage 242 entry to the byte count of the found link entry.

If there are additional nodes in the path 424, 426, traffic simulator 254 makes the next node above the new origination node and selects the next node in the path as the new next node 428. Traffic simulator 254 repeats the above procedure for each link in the path until traffic simulator 254 has added the data byte count of the selected path storage 242 entry to each link entry in simulation storage 282 in the path 426, at which point traffic simulator 254 selects 440-444 another unselected entry in path storage 242 and repeats the above procedure for the selected entry in path storage 242 until the data byte counts for each path in path storage 242 have been added to the data byte count for the corresponding link entry in simulation storage 282. Once traffic simulator 254 has populated simulation storage 282 with the cumulated traffic of each link as described above, traffic simulator 254 signals 446 hotspot identifier 260.

Identify Hotspots

Hotspot identifier 260 examines each link entry in simulation storage 282, comparing the data byte count of the link to the bandwidth for that link in IGP/(I)BGP storage 224, and identifies and records the paths that have high bandwidth utilization links as one of their components.

To identify high bandwidth utilization links, hotspot identifier 260 selects the first link entry in simulation storage 282, and locates the corresponding entry in IGP/(I)BGP storage 224. Hotspot identifier 260 divides the data byte count from the selected entry by the time interval used to group the actual traffic storage 252 entries as described above to get bytes per second, and then divides this quotient by the bandwidth from the located entry to get the utilization. Hotspot identifier 260, stores the utilization in the link entry in simulation storage 282.

Hotspot identifier 260 selects the next previously unselected link entry in simulation storage 282, locates the corresponding entry in IGP/(I)BGP storage 224, and repeats the procedure described above until hotspot identifier 260 has computed the utilization for all links in simulation storage 282.

Hotspot identifier 260 sorts the links in simulation storage 282 by utilization and selects a number of links with the largest utilizations, such as fifty, and for each of the selected links, scans path storage 242 for paths that utilize the link. Hotspot identifier 260 examines the value of a "first pass" flag, which system 200 has initialized to "true", in load storage 256. If the first pass flag is true, hotspot identifier 260 stores the identifiers of these located paths in load storage 256. These paths containing links with large utilizations are herein referred to as "hotspot paths".

In another embodiment, hotspot identifier 260 selects the 100 links with the largest utilization before scanning path storage 242 as described above, although other embodiments store other numbers of links.

Once hotspot identifier 260 has stored the list of hotspot paths in load storage 256, hotspot identifier 260 signals source identifier 264.

Identify Sources

Source identifier 264 scans actual traffic storage 252 looking for packets that use the hotspot paths in load storage 256 to traverse the AS. To identify packets that use any hotspot path, source identifier 264 selects the first entry from actual traffic storage 252. Source identifier 264 extracts the path identifier from the selected entry in actual traffic storage 252, and compares the extracted path of the selected entry from actual traffic storage 252 with the identifiers of the hotspot paths. If the path identifier of the selected entry in actual traffic storage 252 matches any of the hotspot paths, source identifier 264 increments a counter associated with the matching path and stored in load storage 256 and also increments a counter associated with each ingress router used to obtain traffic, such counters for ingress routers being stored in actual traffic storage 252. Each such counter is initialized to zero. In one embodiment, the counter may be incremented by one for each packet, and in another embodiment, the counter may be incremented by the number of bytes in the packet.

Source identifier 264 selects the next entry from actual traffic storage 252 and repeats the above procedure for all entries in actual traffic storage 252.

In another embodiment, instead of using all of the packets in actual traffic storage 252, source identifier 264 only uses those packets that correspond to the marked measure of traffic entries stored in traffic estimator 280.

Source identifier 264 then identifies the ingress router having the highest counter in actual traffic storage 252.

Identify Address Ranges

Address range identifier 262 scans the paths in load storage 256, and stores internally within address range identifier 262 the identifiers of each hotspot path and the counters. Address range identifier 262 then sorts the identifiers of the paths in descending order by counter in order to create a list of paths sorted by frequency of occurrence, which it internally stores. In addition, for each hotspot path, address range identifier 262 builds a table with one column containing each of the prefixes and masks advertised by the router at the end of the path and stored in IGP/(I)BGP storage 224 (each prefix and mask being stored in a different row of the table) and another column containing a counter, which is initialized to zero.

Address range identifier 262 then scans actual traffic storage 252 and if an entry in actual traffic storage 252 has a path matching a hotspot path, address range identifier 262 locates the entry in the table having a prefix and mask that corresponds to the destination address of the entry in actual traffic storage 252. A prefix and mask corresponds to an address when the address ANDed bit by bit with the mask is identical to the prefix. In the event that more than one prefix and mask pair corresponds to the address, the prefix and mask pair with the fewest number of trailing zeros (when the prefix is converted to bits) is selected as the prefix and mask with the correspondence. Address range identifier 262 then increments the counter in the row of the table with a prefix and mask corresponding to the entry in actual traffic storage 252, either by one or by the number of bytes in the packet corresponding to the entry in actual traffic storage 252.

In one embodiment, only those entries in actual traffic storage 252 that correspond to one of the marked measure of traffic entries in traffic estimator 280 are used by address range identifier 262 as described above. In another embodiment, address range identifier 262 only uses entries having an ingress router matching the one identified by source identifier 264. In still another embodiment, address range identifier 262 only uses entries in actual traffic storage 252 that meet all of these criteria.

Address range identifier 262 then identifies the ranges of addresses for which significant traffic is generated over the hotspot paths. A range of addresses corresponds to a prefix and mask that was used to advertise, via (I)BGP, the addresses reachable by a border router. There are many ways of identifying ranges of addresses, some of which will now be described.

In one embodiment, address range identifier 262 identifies the one or more ranges of addresses that generate more than a certain threshold percentage (such as 30% or 50%) of traffic over each of the hotspot paths. To identify such address ranges, address range identifier 262 scans the table in each path, and starting with the range with the highest counter, selects, in descending order, the smallest number of the prefixes and masks that define each range of addresses for which the sum of the counts for each such selected range equals or exceeds the threshold percentage of the counter for the path. Address range identifier 262 marks each such range for each such hotspot path.

In another embodiment, address range identifier 262 selects and marks a specific number of the ranges of addresses in the table for each hotspot path that have the highest counters. In still another embodiment, address range identifier 262 uses a modified form of either technique described above, but does not select and mark ranges of addresses that have a counter in the table that is below a threshold percentage of the counter for the hotspot path. In still another embodiment, either of the first two techniques may be used as a limit for another, so for example, address range identifier 262 will select and mark the minimum number of paths using either of the first two techniques described above. Other criteria may be used in place of, or in conjunction with, any of the techniques described above.

Address range identifier 262 then builds a list of all the marked ranges of addresses for all hotspot paths, eliminating any duplicates, and provides the list to address range reallocator 266. Address range identifier 262 retrieves the IP address of the ingress router identified by source identifier 264 and provides it to address range reallocator 266 as the address of the ingress router to use for reallocating and/or splitting as described in the related application Ser. No. 10/298,938.

Reallocate/Split Address Ranges

Address range reallocator 266 performs the functions described in the related application Ser. No. 10/298,938 to reallocate and/or split the address ranges it receives from address range identifier. In one embodiment, address range reallocator 266 uses the information stored in IGP/(I)BGP storage 224 and may use the graph of the AS built in graph storage 232 instead of building its own as described in the related application Ser. No. 10/298,938. Any of the various options described in that related application may be fixed in address range reallocator 266, or address range reallocator 266 may allow the user to set the options in address range reallocator 266 in the same manner as the user would anticipate setting such options in the apparatus that will be used to reallocate and/or split addresses on the AS in the manner described in the related application Ser. No. 10/298,938.

In one embodiment, in contrast to the technique described in the related application Ser. No. 10/298,938, address range reallocator 266 does not provide (I)BGP information to the routers in the AS in a manner similar to a route reflector when the ranges of addresses to reallocate and/or split are received from address range identifier 262. Instead, address range reallocator 266 places such information in a second storage area of IGP/(I)BGP storage 224 for use as described below.

Repeat with New (I)BGP Information.

Once address range reallocator 266 has provided the (I)BGP information with reallocated and/or split address ranges to the second storage area of IGP/(I)BGP storage 224, address range reallocator 266 causes system 200 to rebuild graph storage 232, recompute the paths in path storage 242, and re-simulate using the data in actual traffic storage 252 in order to identify a new set of hotspot paths in the same manner as described above, but using the (I)BGP information in the second storage area of IGP/(I)BGP storage 224 instead of the originally-received (I)BGP information as described above.

In order to identify a new set of hotspot paths, address range identifier 262 sets the "first pass" flag in load storage 256 to "false", and signals node builder/modifier 230 to repeat the process as described above, up to the operation of hotspot identifier 260. When hotspot identifier 260 detects that the "first pass" flag is false, hotspot identifier 260 stores the second set of hotspot paths in load storage 256 without overwriting the prior set of hotspot paths, marks the second set of hotspot paths as described above, and signals report generator 270.

Reporting

Report generator 270 reads load storage 256 and simulation storage 282 and constructs a report that shows the utilization of the hotspot paths both before and after the operation of address range reallocator 266. In one embodiment, report generator 270 sorts the hotspot links in descending order of utilization into one list before the operation of address range reallocator 266 and sorts the hotspot links in descending order of utilization into another list after the operation of address range reallocator 266, and displays the lists.

In one embodiment, report generator 270 provides a list of the twenty five highest utilization links (sorted in descending order of utilization), either before the operation of address range reallocator, or the twenty five highest utilization links after the operation of address range reallocator, and displays for each such link, the IP addresses of the nodes at the ends of the link, the utilization before the operation of address range reallocator and the utilization after the operation of address range reallocator.

In one embodiment, statistics for all links are provided, such as by showing a mean and median utilization, highest and lowest utilization, or a bar graph indicating the number of links at different ranges of utilizations.

These reports allow a user to compare the simulated utilization of links both without the use of address range reallocator 266 and after its use.

If the user desires, after reviewing the reports, the user may signal address range reallocator 266 to provide the reallocated ranges of addresses and assignments of ranges of addresses to border routers as described in the related application Ser. No. 10/298,938.

Figure 3:
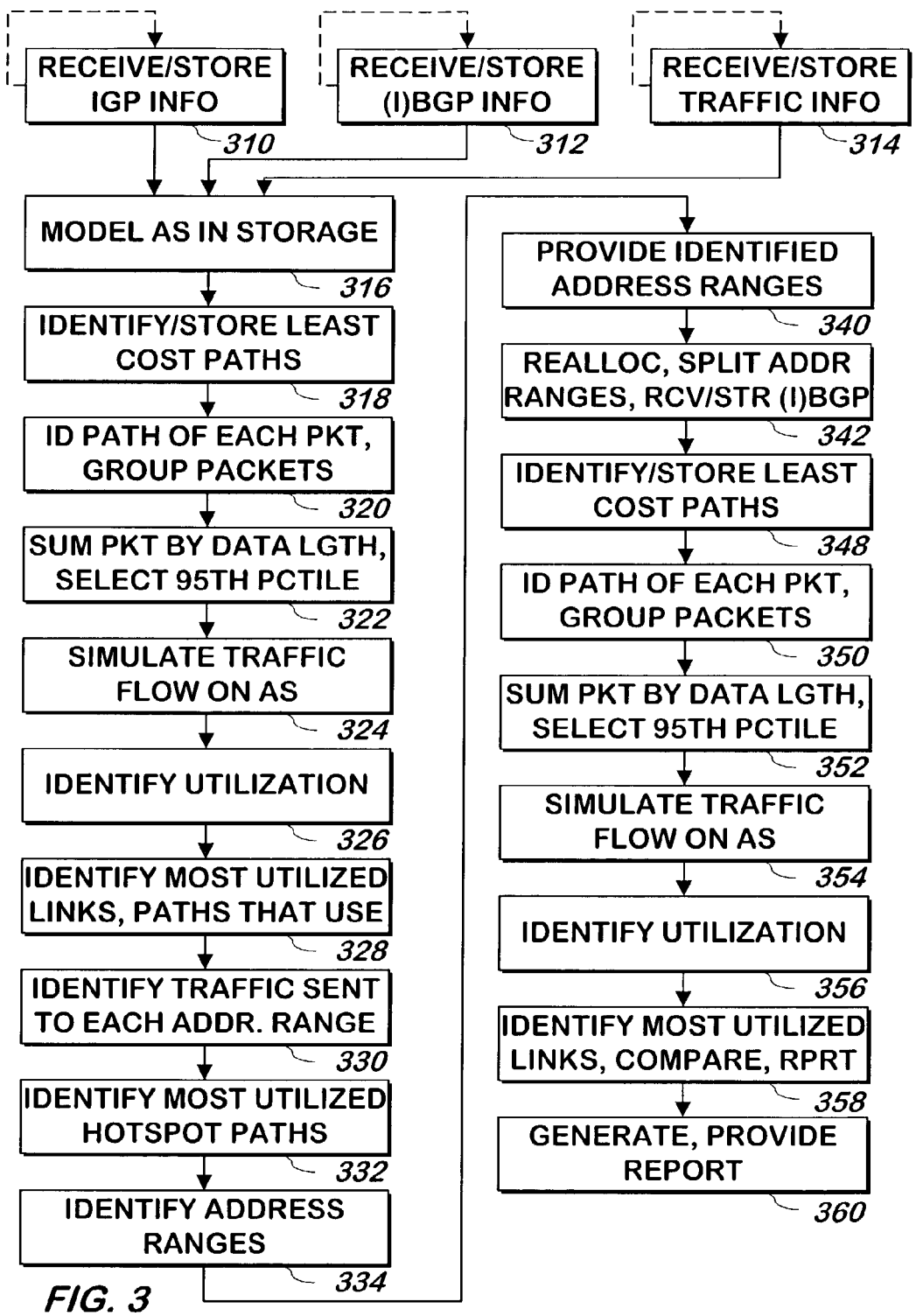
FIG. 3 is a flowchart illustrating a method of identifying addresses to reallocate and/or split and identifying the effect of such reallocation and/or splitting according to one embodiment of the present invention.

Referring now to FIG. 3, a method for identifying addresses to reallocate and/or split and identifying the effect of such reallocation and/or splitting is shown according to one embodiment of the present invention. IGP information is received 310 and stored, (I)BGP information is received 312 and stored, and traffic information is received 314 and stored as described above. The network is modeled 316, for example by building a graph of the network in storage as described above, and all least-cost paths between pairs of routers such as all border routers are identified 318 and stored as described above.

The path of each packet received is identified 320, and entries for each packet are grouped by time as described above. The data byte lengths of each entry having a common path and time period are summed 322 and a representative sum for each path, such as the ninety-fifth percentile sum for each path, is selected and optionally adjusted as described above. Traffic flow is simulated 324 over the AS, and the utilization of each link is identified 326 as described above. The links having the highest utilization are identified as hotspots as described above, paths using such links are identified and stored as hotspot paths, an ingress router supplying the largest contribution of traffic to the hotspot paths is identified 328, and the amount of data being sent to each of the address ranges in each of the paths is identified 330 as described above.

The most utilized hotspot paths are identified 332, and address ranges corresponding to these hotspot paths and meeting certain criteria are identified 334 as described above. The identified address ranges are provided 340 as addresses that should be considered for reallocation and/or splitting as described in the related application Ser. No. 10/298,938, and those addresses are reallocated and/or split and the (I)BGP information for the AS including the reallocated and/or split address ranges is received and stored 342 as described above.

The least cost paths for the same pairs of routers as was used in step 318 are identified and stored 348 using the (I)BGP information received in step 342 as described above. The paths for each packet received in step 314 are identified 350 using the least cost paths identified in step 348. A representative set of traffic for each path is selected using the paths identified in step 350 is selected 352 and optionally adjusted in a manner similar to that used in step 322 as described above. Traffic on the AS is simulated 354 using the representative traffic selected in step 352 and the paths assigned in step 350. The utilization of each link is identified 356 as described above. The most utilized links are optionally identified 358 and one or more reports are generated and provided 360 as described above.

What is claimed is:

1. A method of reallocating at least one block of addresses from a plurality of blocks of addresses, the method comprising:
   receiving the plurality of blocks of addresses in at least one message, the at least one message identifying the blocks of addresses and indicating a correspondence between each of the blocks in the plurality and at least one border router, each of the blocks in the plurality containing at least one address, all of the at least one address in a block being contiguous with one another;
   responsive to the receiving step, simulating at least a portion of traffic flowing to the at least one border router to produce a first result; and
   responsive to the simulating step, at least one selected from:
   indicating a change in the correspondence of at least one block; and
   indicating a change in the make up of at least one of the at least one block.

2. The method of claim 1 wherein the change in the correspondence comprises removing a correspondence between at least one of the at least one block of addresses and a border router that had been received in at least one of the at least one message.

3. The method of claim 1 additionally comprising:
   simulating at least a portion of the traffic flowing to the at least one border router responsive to at least one of the indicating steps to produce a second result; and
   comparing the first result to the second result.

4. The method of claim 1 wherein the simulating step comprises identifying at least one most heavily utilized link.

5. The method of claim 4 wherein the simulating step comprises identifying the at least one block of addresses for which at least one of the changes will be indicated responsive to traffic contributing to said utilization of the at least one most heavily utilized link.

6. The method of claim 1 wherein the simulating step is responsive to actual traffic received.

7. The method of claim 1, wherein the at least one message comprises at least one selected from an (I)BGP message and a BGP message.

8. A system for reallocating at least one block of addresses from a plurality of blocks of addresses, the system comprising:
   a receiver having an input for receiving the plurality of blocks of addresses in at least one message, the at least one message identifying the blocks of addresses and indicating a correspondence between each of the blocks in the plurality and at least one border router, each of the blocks in the plurality containing at least one address, all of the at least one address in a block being contiguous with one another;
   a simulator coupled to the receiver for receiving at least a portion of at least one of the at least one message, the simulator for simulating at least a portion of traffic flowing to the at least one border router to produce a first result responsive to the at least the portion of the at least one of the at least one message; and
   a changer coupled to the simulator, the changer for, responsive to the first result, at least one selected from:
   indicating at an output a change in the correspondence of at least one block, said correspondence received from at least one selected from the simulator and the receiver; and
   indicating at the output a change in the make up of at least one of the at least one block, said at least one block received from at least one selected from the simulator and the receiver.

9. The system of claim 8, wherein the changer changes the correspondence by removing a correspondence between at least one of the at least one block of addresses and a border router that had been received in at least one of the at least one message.

10. The system of claim 8:
    wherein the simulator is coupled to the changer output, and the simulator is additionally for simulating at least a portion of the traffic flowing to the at least one border router responsive to at least one of the indicating steps to produce a second result; and
    the system additionally comprises a report generator coupled to the simulator for receiving the first result and the second result, the simulator for comparing the first result to the second result to produce a comparison, provided at an output.

11. The system of claim 8, wherein the simulator comprises:
    a topology generator having an input for receiving topology information about at least a portion of a network comprising the at least one border router, the topology generator for generating and providing at an output a topology for the at least the portion of the network;
    a path calculator having an input coupled to the topology generator output for receiving the topology, the path calculator for calculating at least one path responsive to the topology, and providing the at least one path at an output;
    a traffic simulator having an input coupled to the path calculator output for receiving the at least one path, the traffic simulator for simulating traffic on the network responsive to the path, and for providing at an output a traffic load for at least one path; and
    a hotspot identifier having an input coupled to the traffic simulator output for receiving the traffic load, the hotspot identifier for identifying and providing at an output at least one identifier of each of at least one most heavily utilized link responsive to the traffic load.

12. The system of claim 11, the simulator additionally comprising:
    a source identifier having a hotspot input coupled to the hotspot identifier output for receiving the at least one identifier of each of the at least one most heavily utilized link and a simulation input coupled to the traffic simulator output for receiving the traffic load, the source identifier for identifying at least one address of the traffic load corresponding to the at least one most heavily utilized link, and providing said source addresses at an output; and
    an address range identifier having an address input coupled to the source identifier output for receiving the at least one address, and an address block input coupled to the receiver for receiving the plurality of blocks of addresses, the address range identifier for identifying at the least one block of addresses from the plurality of blocks of addresses corresponding to the at least one address received at the address range identifier address input.

13. The system of claim 8, wherein the simulator is additionally for receiving actual traffic, and the simulator simulates responsive to actual traffic received.

14. The system of claim 8, wherein the at least one message comprises at least one selected from an (I)BGP message and a BGP message.

15. A computer program product comprising a computer useable storage medium having computer readable program code embodied therein for reallocating at least one block of addresses from a plurality of blocks of addresses, the computer program product comprising computer readable program code devices configured to cause a computer to:

receive the plurality of blocks of addresses in at least one message, the at least one message identifying the blocks of addresses and indicating a correspondence between each of the blocks in the plurality and at least one border router, each of the blocks in the plurality containing at least one address, all of the at least one address in a block being contiguous with one another;

responsive to the computer readable program code devices configured to cause the computer to receive, simulate at least a portion of traffic flowing to the at least one border router to produce a first result; and responsive to the computer readable program code devices configured to cause the computer to simulate, computer readable program code devices configured to cause the computer to, at least one selected from:

indicate a change in the correspondence of at least one block; and indicate a change in the make up of at least one of the at least one block.

16. The computer program product of claim 15 wherein the computer readable program code devices configured to cause the computer to change the correspondence comprises computer readable program code devices configured to cause the computer to remove a correspondence between at least one of the at least one block of addresses and a border router that had been received in at least one of the at least one message.

17. The computer program product of claim 15 additionally comprising computer readable program code devices configured to cause the computer to:

simulate at least a portion of the traffic flowing to the at least one border router responsive to at least one of the indicating steps to produce a second result; and compare the first result to the second result.

18. The computer program product of claim 15 wherein the computer readable program code devices configured to cause the computer to simulate comprise computer readable program code devices configured to cause the computer to identify at least one most heavily utilized link.

19. The computer program product of claim 18 wherein the computer readable program code devices configured to cause the computer to simulate comprise computer readable program code devices configured to cause the computer to identify the at least one block of addresses for which at least one of the changes will be indicated responsive to traffic contributing to said utilization of the at least one most heavily utilized link.

20. The computer program product of claim 15 wherein the computer readable program code devices configured to cause the computer to simulate are responsive to actual traffic received.

21. The computer program product of claim 15, wherein the at least one message comprises at least one selected from an (I)BGP message and a BGP message.

* * * * *